(12) United States Patent
Akedo et al.

(10) Patent No.: US 9,575,216 B2
(45) Date of Patent: Feb. 21, 2017

(54) INFRARED-TRANSMITTING FILM, METHOD FOR PRODUCING INFRARED-TRANSMITTING FILM, INFRARED OPTICAL COMPONENT, AND INFRARED DEVICE

(75) Inventors: Jun Akedo, Ibaraki (JP); Hiroki Tsuda, Ibaraki (JP); Keishi Ohashi, Tokyo (JP); Shoji Sekino, Tokyo (JP); Shin Nakamura, Tokyo (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 144 days.

(21) Appl. No.: 14/119,654

(22) PCT Filed: May 1, 2012

(86) PCT No.: PCT/JP2012/061934
§ 371 (c)(1),
(2), (4) Date: Mar. 6, 2014

(87) PCT Pub. No.: WO2012/160979
PCT Pub. Date: Nov. 29, 2012

(65) Prior Publication Data
US 2014/0198379 A1    Jul. 17, 2014

(30) Foreign Application Priority Data
May 24, 2011    (JP) .................................. 2011-115322

(51) Int. Cl.
G02B 1/02    (2006.01)
G02B 1/10    (2015.01)
G02B 5/20    (2006.01)

(52) U.S. Cl.
CPC ............... *G02B 1/105* (2013.01); *G02B 5/208* (2013.01)

(58) Field of Classification Search
CPC .............................. G02B 1/105; G02B 5/208
(Continued)

(56) References Cited

U.S. PATENT DOCUMENTS 2,834,689 A * 5/1958 Jupnik .................... C03C 3/321
359/359
4,568,140 A    2/1986 van der Werf et al.
(Continued)

FOREIGN PATENT DOCUMENTS

EP    0 518 551 A1    12/1992
EP    1096189 A1    5/2001
(Continued)

OTHER PUBLICATIONS

Junichi Iwasawa et al., "Dense Yttrium Oxide Film Prepared by Aerosol Deposition Process at Room Temperature", Journal of the Ceramic Society of Japan 2006, pp. 272-276, vol. 114, No. 3.
(Continued)

*Primary Examiner* — Bumsuk Won
*Assistant Examiner* — Henry Duong
(74) *Attorney, Agent, or Firm* — Sughrue Mion, PLLC

(57) ABSTRACT

An infrared-transmitting film which is excellent in mechanical strength and environmental resistance. The infrared-transmitting film comprises a buffer layer formed on a surface of an infrared optical substrate and having a Vickers hardness greater than that of the substrate and an environmental resistance improving layer provided in contact with the buffer layer and having a Vickers hardness greater than that of the buffer layer.

13 Claims, 3 Drawing Sheets

(58) Field of Classification Search
USPC .......................................... 359/350; 427/162
See application file for complete search history.

(56) References Cited

U.S. PATENT DOCUMENTS

| | | | | |
|---|---|---|---|---|
| 5,512,748 | A * | 4/1996 | Hanson ...................... | G01J 5/02 250/331 |
| 5,837,362 | A * | 11/1998 | O'Connell ............. | G02B 1/105 359/359 |
| 6,335,086 | B1 * | 1/2002 | Veerasamy ............ | B05D 5/083 428/212 |
| 6,785,044 | B2 * | 8/2004 | Minami ................... | G02B 1/11 359/350 |
| 8,124,240 | B2 * | 2/2012 | Ohmi ........................ | C23C 4/02 428/469 |
| 2008/0097302 | A1 * | 4/2008 | Chen ........................ | A61L 29/04 604/103.07 |

FOREIGN PATENT DOCUMENTS

| | | |
|---|---|---|
| JP | 59-228201 A | 12/1984 |
| JP | 61-28962 B2 | 7/1988 |
| JP | 63-294501 A | 12/1988 |
| JP | 64-9401 A | 1/1989 |
| JP | 64-15703 A | 1/1989 |
| JP | 1-145601 A | 6/1989 |
| JP | 1-302203 A | 12/1989 |
| JP | 2-11121 B2 | 3/1990 |
| JP | 2-13761 B2 | 4/1990 |
| JP | 3-197686 A | 8/1991 |
| JP | 4-217202 A | 8/1992 |
| JP | 5-150101 A | 6/1993 |
| JP | 5-232301 A | 9/1993 |
| JP | 6-82164 B2 | 10/1994 |
| JP | 6-313802 A | 11/1994 |
| JP | 2001-3180 A | 1/2001 |
| JP | 2001-124220 A | 5/2001 |
| JP | 2002-131505 A | 5/2002 |
| JP | 2003-149406 A | 5/2003 |
| JP | 3639822 B2 | 1/2005 |
| JP | 2005-275434 A | 10/2005 |
| JP | 4022629 B2 | 12/2007 |
| JP | 2008-268281 A | 11/2008 |

OTHER PUBLICATIONS

Jun Akedo, Applied Physics 1999, pp. 44-47, vol. 68.
Hergen Eilers, "Fabrication, optical transmittance, and hardness of IR-transparent ceramics made from nanophase yttria", Journal of the European Ceramic Society 2007, pp. 4711-4717, vol. 27, Issue 16.
Jun Akedo et al., "Powder Preparation in Aerosol Deposition Method for Lead Zirconate Titanate Thick Films", Jpn. J. Appl. Phys. 2002, pp. 6980-6984, vol. 41.
Jing-Feng Li et al., "Properties of Modified Lead Zirconate Titanate Ceramics Prepared at Low Temperature (800° C.) by Hot Isostatic Pressing", J. Am. Ceram. Soc. 2000, pp. 955-957, vol. 83, No. 4.
O. Guillon et al., "New considerations about the fracture mode of PZT ceramics", Journal of the European Ceramic Society 2005, pp. 2421-2424, vol. 25.
International Search Report for PCT/JP2012/061934 dated Jun. 5, 2012.
Communication dated Nov. 11, 2015 from the Japanese Patent Office in counterpart application No. 2013-516285.
Communication dated May 7, 2015 from the Japanese Patent Office in counterpart application No. 2013-516285.

* cited by examiner

INFRARED-TRANSMITTING FILM, METHOD FOR PRODUCING INFRARED-TRANSMITTING FILM, INFRARED OPTICAL COMPONENT, AND INFRARED DEVICE

CROSS REFERENCE TO RELATED APPLICATIONS

This application is a National Stage of International Application No. PCT/JP2012/061934 filed May 1, 2012, claiming priority based on Japanese Patent Application No. 2011-115322 filed May 24, 2011, the contents of all of which are incorporated herein by reference in their entirety.

TECHNICAL FIELD

This invention relates to an infrared-transmitting film for use with a window member or a lens as an optical component, particularly a window member or a lens of an infrared device which is used in the mid- to far-infrared region, a method of producing the infrared-transmitting film, an infrared optical component, and an infrared device.

BACKGROUND OF THE INVENTION

Infrared cameras with an infrared image sensor often use two wavelength ranges of a 3 to 5 μm band and an 8 to 12 μm band each being a wavelength band, called the atmospheric window, where absorption due to water molecules and so on in the air is small. Herein, in particular, since the 8 to 12 μm band corresponds to the peak radiation wavelength of blackbody radiation near room temperature, this band is widely used for measuring the distribution of temperatures such as temperatures of the human body. In an infrared device such as an infrared camera, a material having a high infrared transmittance in the above-mentioned band is used as a window member adapted to prevent entry of dust or the like from the outside and to sufficiently introduce infrared light. For example, chalcogenide-based compounds typified by zinc selenide (ZnSe) and zinc sulfide (ZnS), germanium (Ge), and so on are widely used.

As a window member for infrared light with a longer wavelength, KRS-5 as a mixed crystal of thallium iodide (TlI) and thallium bromide (TlBr) and KRS-6 as a mixed crystal of thallium chloride (TlCl) and thallium bromide (TlBr) are well known. KRS-5 has a high transmittance for infrared light of up to 40 μm while KRS-6 has a high transmittance for infrared light of up to 20 μm. However, even with such a material, there is a problem that a surface is roughened due to deliquescence to cause a change in optical properties in a severe environment such as an aircraft system.

A lens member or a window member of an infrared device is required to demonstrate its performance even in a relatively severe environment and thus should be formed with an infrared-transmitting film for the purpose of protecting a surface thereof. There are many proposals for such an infrared-transmitting film.

For example, there are an infrared-transmitting film obtained by stacking a two-layer film of a $PbF_2$ film and a $ThF_4$ film on a ZnSe substrate (Patent Document 1), an infrared-transmitting film obtained by stacking a three-layer film of $YF_3$, ZnS, and $YF_3$ on a ZnSe or ZnS substrate (Patent Document 2), an infrared-transmitting film obtained by forming respective films of ZnS, Ge, ZnS, $BaF_2$, and ZnS on a Ge substrate (Patent Document 3), an infrared-transmitting film obtained by forming respective films of ZnS or ZnSe, Ge, ZnS, and $BaF_2$ on a Ge substrate (Patent Document 4), and so on.

As proposals referring to the protection of a substrate surface, there are, for example, an optical element comprising a base layer of ZnS or the like and a film comprising a base layer of $Y_2O_3$ or the like with an elastic modulus twice or more that of the base layer of ZnS or the like and being transparent also in the visible light region (Patent Document 5), an infrared-transmitting film using ZnSe or ZnS as a substrate and comprising an adhesion reinforcing layer of $TiO_2$ or $Y_2O_3$ and an abrasion resistance reinforcing layer of $Y_2O_3$ as an outermost Layer (Patent Document 6), a structure in which $YF_3$ excellent in environmental resistance such as water resistance or moisture resistance is used as a low refractive index layer for use as an infrared-transmitting film and a structure in which $Y_2O_3$ is further disposed as an adhesion reinforcing layer on the $YF_3$ layer to provide a highly durable film (Patent Document 7), a structure in which diamond-like carbon is used as an outermost layer which serves as an abrasion resistance reinforcing layer of an infrared-transmitting film (Patent Document 8), and so on.

In the above-mentioned documents, the feature is to use the zinc sulfide (ZnS) substrate, the zinc selenide (ZnSe) substrate, the germanium (Ge) substrate, or the like. However, ZnS has a disadvantage in that the transmittance for infrared light is low while ZnSe and Ge have a disadvantage in that the price is high. Therefore, a material which is high in infrared transmittance and low in price is required for a window member that is required to efficiently introduce infrared light.

On the other hand, for example, a metal halide such as barium fluoride ($BaF_2$) or sodium chloride (NaCl) is high in infrared transmittance and low in price and thus is a material suitable as a window member. In particular, the barium fluoride ($BaF_2$) has a high transmittance up to a wavelength of about 13 μm and its corrosion effect on water is small unless it reaches 500° C. or higher (Patent Document 9).

On the other hand, $BaF_2$ is a brittle material. When a comparison is made in terms of Vickers hardness, $BaF_2$ shows a small value of 88 to 94 kgf/mm² while Ge shows 1000 to 1500 kgf/mm², ZnS shows about 230 kgf/mm², and ZnSe shows about 110 kgf/mm². Therefore, in order to use a $BaF_2$ substrate as a window member or a lens member of an infrared device, it should be provided with a protective layer for ensuring the mechanical strength (Patent Document 9).

PRIOR ART DOCUMENT

Patent Document:
  Patent Document 1: JP-B-S61-28962
  Patent Document 2: JP-A-S64-15703
  Patent Document 3: JP-B-H2-11121
  Patent Document 4: JP-B-H2-13761
  Patent Document 5: JP-B-H6-82164
  Patent Document 6: Japanese Patent (JP-B) No. 3639822
  Patent Document 7: JP-A-H6-313802
  Patent Document 8: JP-A-S63-294501
  Patent Document 9: JP-A-2002-131505

SUMMARY OF THE INVENTION

Problem to be Solved by the Invention

As described above, since the metal halide such as $BaF_2$ has excellent infrared transmission performance, it is preferable as a substrate of a lens member or a window member of an infrared device, but since it has a problem that the mechanical strength and the environmental resistance are low, it is necessary to form on such a substrate an infrared-transmitting film having an effect of enhancing the mechanical strength and the environmental resistance.

However, in the case where the brittle material such as $BaF_2$ is used as the substrate, although the above-mentioned document discloses a method of using a high elastic modulus material with large tensile and compressive stresses as an outermost layer for improving the environmental resistance, if a high hardness film is formed on a surface of the substrate of the low hardness brittle material, there are problems that the adhesion of the film tends to be reduced due to the brittleness of the substrate surface and that peeling tends to occur at the interface between the layers in an environment where temperature changes are significant.

Further, the infrared-transmitting film of the lens, the window member, or the like is also required to have a function as an antireflection film and, in order to maximize the transmittance, it is necessary to properly set the refractive index of a material and the film thickness. Therefore, in order to allow a single-layer film to exhibit the function of the antireflection film, it is necessary to coat a material having a refractive index smaller than that of the substrate. However, a metal halide itself is usually a low refractive index material and thus, only with the coating in the form of the single layer, it is difficult to form an infrared-transmitting film without reducing the infrared transmittance. Accordingly, it is necessary to form coating of a plurality of layers which requires an optical design. Therefore, while the metal halide is low-priced as a substrate material, there is no big price difference compared to a conventional component as a lens member or a window member.

This invention has been made in order to solve these problems and it is an object of this invention to obtain an infrared-transmitting film which is excellent in mechanical strength and environmental resistance compared to a conventional one.

Means for Solving the Problem

As a result of intensive studies to achieve the above-mentioned object, the present inventors have found that, among indices representing the mechanical strength of a substrate material, the hardness is an important parameter not only for the substrate material but also for a film forming an infrared-transmitting film. Specifically, the present inventors have succeeded in experimentally proving a condition where an infrared-transmitting film does not come off a substrate while the hardness of a buffer layer forming the infrared-transmitting film is greater than that of a material of the substrate.

According to a first aspect of this invention, there is provided an infrared-transmitting film characterized by comprising: a buffer layer formed on a surface of an infrared optical substrate and having a Vickers hardness greater than that of the substrate; and an environmental resistance improving layer provided in contact with the buffer layer and having a Vickers hardness greater than that of the buffer layer.

According to a second aspect of this invention, there is provided an infrared-transmitting film manufacturing method characterized by forming the infrared-transmitting film according to the first aspect by an aerosol deposition method.

According to a third aspect of this invention, there is provided an infrared optical component characterized by comprising the infrared-transmitting film according to the first aspect.

According to a fourth aspect of this invention, there is provided an infrared device characterized by comprising the infrared optical component according to the third aspect.

Effect of the Invention

According to this invention, it is possible to obtain an infrared-transmitting film which is excellent in mechanical strength and environmental resistance compared to a conventional one.

MODE FOR CARRYING OUT THE INVENTION

Hereinbelow, an embodiment of this invention will be described in detail with reference to the drawings.

First, referring to FIG. 1, the structure of an optical component 100 comprising an infrared-transmitting film 11 and the structure of an infrared device 200 using the optical component 100 will be described according to this embodiment.

Figure 1:
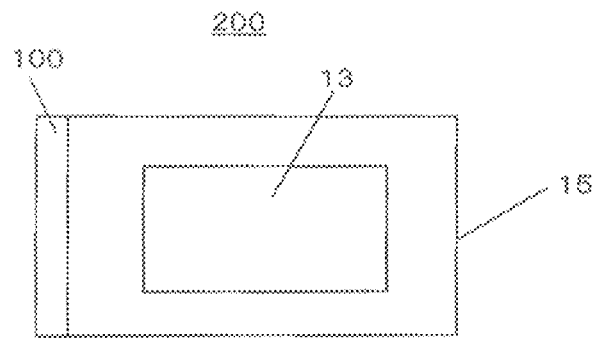
FIG. 1 is a structural diagram of an infrared device 200.

As shown in FIG. 1, the infrared device 200 comprises a case 15 housing an optical system 13, and the optical component 100 provided on one surface of the case 15 and adapted to transmit infrared light therethrough. The infrared device 200 is, for example, an infrared camera.

Figure 2:
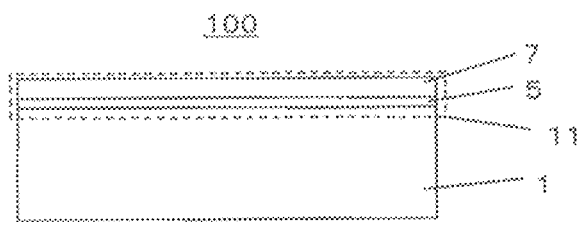
FIG. 2 is a structural diagram of an optical component 100.

As shown in FIG. 2, the optical component 100 comprises a substrate 1 and the infrared-transmitting film 11 provided on a surface of the substrate 1.

The infrared-transmitting film 11 comprises a buffer layer 5 formed on the surface of the substrate 1 as an infrared optical substrate and having a Vickers hardness greater than that of the substrate 1 and an environmental resistance improving layer 7 provided in contact with the buffer layer 5 and having a Vickers hardness greater than that of the buffer layer 5.

Hereinbelow, a material of the substrate 1 and materials and film forming methods of the respective members forming the infrared-transmitting film 11 will be described in detail.

<Material>
(Substrate 1)

As a material forming the substrate 1, use can be made of a single crystal material, a polycrystalline material, or an amorphous material of a compound of metal and nonmetal elements. As the metal element, an alkali metal typified by lithium (Li), sodium (Na), potassium (K), or cesium (Cs), an alkaline earth metal typified by magnesium (Mg), calcium (Ca), or barium (Ba), a transition metal typified by zinc, or the like can be given. As the nonmetal element, a halogen element typified by fluorine (F), chlorine (Cl), or bromine (Br), a chalcogen element typified by oxygen (O), sulfur (S), selenium (Se), or tellurium (Te), or a pnictogen element typified by nitrogen (N), phosphorus (P), or the like can be given. However, the elements given above are by way of example only and are not to be taken by way of limitation.

Preferably, the material forming the substrate 1 has a high infrared transmittance particularly in an 8 to 12 µm band and, more preferably, it can transmit all or part of light in the visible light wavelength band. Specifically, it is possible to select a metal halide typified by an alkali halide or an alkaline earth halide, such as barium fluoride ($BaF_2$), sodium chloride (NaCl), calcium fluoride ($CaF_2$), or magnesium fluoride ($MgF_2$), or a chalcogenide compound such as zinc sulfide (ZnS) or zinc selenide (ZnSe). In particular, limiting to a window member of an infrared camera, since it is required to have a high infrared transmittance and a small refractive index, the metal halide is preferable and the alkali halide or the alkaline earth halide is most preferable. More specifically, $BaF_2$ is most suitable.

However, the material forming the substrate 1 is not limited to the metal halide typified by $BaF_2$ and use can also be made of a brittle material such as ZnS, ZnSe, KRS-5, or KRS-6 which is generally optically transparent. Alternatively, it is also possible to apply an oxide material such as alumina, ferrite, BTO, ITO, or $TiO_2$, a nitride material such as aluminum nitride (AlN) or cubic boron nitride (c-BN), a boride, such as magnesium diboride, a fluoride, a semiconductor material such as Si, or gallium nitride (GaN), or the like. Usually, a single crystal material, a polycrystalline material, or a glass material of a typical metal element (alkali metal or alkaline earth metal) and a nonmetal element (halogen group, sulfur, oxygen, nitrogen) can be used as the substrate 1.

(Infrared-Transmitting Film 11)

As described above, the infrared-transmitting film 11 is formed on the surface of the substrate 1. The infrared-transmitting film 11 comprises the buffer layer 5 formed adhering to the substrate 1 for improving the adhesion between the substrate 1 and the environmental resistance improving layer 7, and the environmental resistance improving layer 7 for improving the environmental resistance of the infrared-transmitting film 11.

It is known that a thin film formed on the substrate 1 is strongly affected by the hardness of the substrate 1. Therefore, the Vickers hardness can be used as an index for the purpose of numerically expressing the hardness of the thin film. In normal Vickers hardness measurement, use is made of an indenter in the form of square pyramid diamond with an angle of 136 degrees between opposite faces. The hardness referred to in this embodiment is a hardness based on micro-Vickers hardness measurement that measures the hardness by setting the load pressing the indenter to 1 kgf (9.8 N) or less. Therefore, in this embodiment, unless specifically stated otherwise, the Vickers hardness will be referred to as a hardness.

The hardness of the substrate 1 and the hardnesses of the buffer layer 5 and the environmental resistance improving layer 7 forming the infrared-transmitting film 11 satisfy the following relationship.

hardness of the substrate 1<hardness of the buffer layer 5<hardness of the environmental resistance improving layer 7

The infrared-transmitting film 11 is applicable not only to an infrared optical material for an 8 to 12 µm band, but also to a material for a light wavelength band in a range where the brittle substrate is transparent.

(Buffer Layer 5)

The buffer layer 5 has a hardness greater than that of the substrate 1.

A material suitable as the buffer layer 5 is determined based on the relationship of its hardness to that of the substrate 1 to be selected and, at the same time, the infrared transmittance is also required. For example, it is possible to select a lead compound in a group comprising lanthanum-doped lead zirconate titanate (PLZT), lead zirconate titanate (PZT), lead titanate (PT), and so on. As a specific hardness, it is preferable that the Vickers hardness of the buffer layer 5 be four times or more that of the substrate 1.

Since the buffer layer 5 aims to improve the adhesion between the substrate 1 and the environmental resistance improving layer 7 having a large difference in hardness (the substrate 1 with a low hardness and the environmental resistance improving layer 7 with a high hardness), the buffering performance is also required in addition to the hardness. Since the lead compound is a material with relatively high buffering performance, it is suitable for use as the buffer layer 5. However, there are also materials with a possibility of obtaining similar buffering performance and, for example, oxides containing Zn, Sn, and so on can be given as candidates.

(Environmental Resistance Improving Layer 7)

Preferably, the environmental resistance improving layer 7 stacked on the buffer layer 5 has water resistance to water, moisture resistance to environmental moisture, chemical resistance to chemical substances, abrasion resistance to dust or the like, temperature resistance for use with wide temperature changes, and impact resistance to collision of hard things or things moving at high speed and is also excellent in infrared transmittance. Further, it is preferable that the material be excellent in static and dynamic mechanical strength in addition to the above-mentioned resistances. As such a material, it is possible to select a material with mechanical strength greater than that of the substrate 1 and an oxide-based material is suitable. As the environmental resistance improving layer 7, it is preferable to select a material with a hardness greater than those of the substrate 1 and the buffer layer 5. Specifically, the material preferably has a Vickers hardness in a range of 100 to 1000 $kgf/mm^2$.

As the material forming the environmental resistance improving layer 7, it is possible to select, for example, a metal oxide such as yttrium oxide ($Y_2O_3$), aluminum oxide ($Al_2O_3$), titanium oxide ($TiO_2$), zirconium oxide ($ZrO_2$), iron oxide ($FeO_x$), barium titanate ($BaTiO_3$), or chromium oxide ($Cr_2O_3$), diamond-like carbon (DLC), aluminum nitride (AlN), or the like. Since the environmental resistance improving layer 7 primarily aims to improve the environmental resistance, its infrared transmittance is not necessarily high (as high as those of the substrate 1 and the buffer layer 5), but, in order to obtain a sufficient hardness, there may be a case where the thickness enough to affect the infrared transmittance is required. Therefore, a material having a relatively high infrared transmittance and capable of obtaining sufficient environmental resistance is preferable and, for example, $Y_2O_3$ is suitable.

The foregoing are details of the materials of the substrate 1 and the respective members forming the infrared-transmitting film 11.

<Film Forming Method>

As a method of forming the buffer layer 5 on the substrate 1 and a method of forming the environmental resistance improving layer 7 on the buffer layer 5, it is possible to select, for example, a vacuum deposition method, an ion plating method, a sputtering method, a CVD (Chemical Vapor Deposition) method, a sol-gel method, an aerosol deposition method, or the like. In particular, the aerosol deposition method is a film forming method that uses the change in fracture toughness with respect to the particle size of a brittle powder and tends to increase the adhesion to the brittle material substrate. Therefore, the aerosol deposition method is suitable for forming the buffer layer 5 in this invention.

Specifically, according to the vacuum deposition method, the ion plating method, the sputtering method, or the CVD (Chemical Vapor Deposition) method, when forming a film, a layer material is reduced to an atomic or molecular state in a high vacuum environment and then transported to the substrate surface, thereby forming the infrared-transmitting film 11 on the substrate surface. However, in such a film forming method, since the layer material is reduced to the atomic or molecular state, if the substrate temperature is not sufficiently high, the stacked film has an amorphous structure and, even if it is crystallized by a subsequent heat treatment, there is a tendency of occurrence of many lattice defects. Further, in the case of a substrate material having brittleness, a film with a higher strength is formed as the infrared-transmitting film 11 provided for the purpose of improving the environmental resistance, but may possibly come off the substrate 1 due to non-matching between the substrate 1 and the infrared-transmitting film 11.

On the other hand, according to the aerosol deposition method, it is possible to form nascent surfaces by crushing material particles by an impact force due to particle collision, ultrasonic application, or the like so that interparticle bonds can be formed at a relatively low temperature (see, e.g. JP-A-2001-3180 and Jun Akedo: Applied Physics, Vol. 68, pp. 44-47, 1999). In the aerosol deposition method, a layer material is caused to adhere to the substrate surface in a submicron-sized particle state and therefore it is possible to obtain a crystallized layer even when the substrate temperature is the room temperature. Further, since high vacuum is not required when forming a film by the aerosol deposition method, an apparatus and manufacturing processes can be simplified. Further, since no special binder or the like is required, impurities are difficult to mix into a formed infrared-transmitting film and thus the high purity film can be formed. Further, since crystal grains of a formed film become small in size and dense by applying an appropriate pretreatment to a material powder, the influence of light scattering at grain boundaries is small so that the light transmission loss is small (see, e.g. Japanese Patent (JP-B) No. 4022629). Therefore, using the aerosol deposition method, a stacked film having a high infrared transmittance can be formed more easily and simply.

In the optical component 100, the relationship between the hardness of the substrate 1, that of the buffer layer 5, and that of the environmental resistance improving layer 7 and the materials of the respective layers are important. These properties do not necessarily depend on a film forming method. However, also in terms that impurities are difficult to mix into thin film materials, that since size-controlled particles are introduced in thin film forming stages, it is possible to form a microcrystalline laminate, and further that the film formation control is easy even on a relatively brittle substrate material, it is preferable to use the aerosol deposition method.

In the aerosol deposition method, it is necessary to obtain brittle material particles by applying a pretreatment to each of the materials of the buffer layer 5 and the environmental resistance improving layer 7. A pretreatment method for obtaining the brittle material particles is not particularly limited. However, for example, the brittle material particles can be obtained by pulverizing material particles using a device such as a ball mill that can apply mechanical stress. Further, if impurities such as adsorbed water of the material fine particles made brittle are removed by applying a heat treatment in the air at 200° C. to 1200° C., defects in a formed thin film are reduced so that it is possible to further improve the infrared transmittance (see, e.g. Japanese Patent (JP-B) No. 4022629).

As a method of spraying the brittle material particles onto the substrate 1 in the aerosol deposition method, use can be made of, for example, a method of mixing a gas and fine particles, transferring them, and spraying them by accelerating them through a small open nozzle, or a method of accelerating charged particles in an electrostatic field and crushing them by bringing them into collision with a hard reflector. However, the method of spraying the brittle material particles is not limited to those shown here.

The method of forming the thin film on the substrate 1 by the aerosol deposition method will be described more specifically. A reflective surface and the substrate 1 are disposed in an evacuated film forming chamber. Then, brittle material particles are aerosolized and brought into collision with the reflective surface. Then, using a mechanical crushing effect of ultrafine particles which is produced in this event, activated ultrafine particles, having nascent surfaces, of the brittle material particles are formed. Then, in an evacuated state (1 kPa or less), the activated ultrafine particles are sprayed and adhere to the substrate surface at normal temperature. In this event, since an anchor layer formed at the interface between the film and the substrate 1 can be suppressed to a certain thickness or less, it is possible to reduce damage to the substrate 1 and to ensure the adhesion. The aerosol deposition method also has a feature in that the processes can be carried out in a relatively low vacuum so that the apparatus cost and the process cost can be suppressed.

The thickness of the anchor layer is determined based on the ratio between the Vickers hardness of the substrate material and that of the film particle material. For example, when PZT or PLZT is used as the buffer layer 5 and $Y_2O_3$ is used as the environmental resistance improving layer 7, the thickness of an anchor layer formed between the buffer layer 5 and the environmental resistance improving layer 7 is estimated to be about 0.05 to 0.5 μm from the relationship between the Vickers hardness of the buffer layer 5 and that of the environmental resistance improving layer 7. If the thickness of the buffer layer 5 is less than 0.1 μm, $Y_2O_3$ fine particles forming the environmental resistance improving layer 7 penetrate the buffer layer 5 to reach the substrate 1 underlying the buffer layer 5. Consequently, there arise practically serious problems such that since the adhesion is reduced, peeling tends to occur and that uniform thickness cannot be obtained. On the other hand, if the thickness of the buffer layer 5 exceeds 5 μm, since the absorption of infrared light becomes large, it cannot be used for a window member or a lens member. Therefore, when forming the buffer layer 5 by the aerosol deposition method, assuming that the buffer layer material is PZT or PLZT, the thickness of the buffer layer 5 is preferably set in a range of 0.1 μm to 5 μm and more preferably in a range of 0.1 μm to 3 μm.

If the thickness of the environmental resistance improving layer 7 is less than 0.1 μm, sufficient environmental resistance cannot be obtained while if it exceeds 10 μm, the infrared transmittance is sharply reduced. Therefore, the thickness of the environmental resistance improving layer 7 is preferably set in a range of 0.1 μm to 10 μm.

The buffer layer 5 and the environmental resistance improving layer 7 are each preferably made of a polycrystalline material as described before and its average crystal grain size is preferably 0.1 μm or less and more preferably 100 nm (0.01 μm) or less. Using the aerosol deposition method, such fine polycrystalline grains can be obtained.

While the infrared-transmitting film 11 is formed only on one surface of the substrate 1 in FIG. 2, it can also be formed on a surface, on the opposite side, of the substrate 1 using the above-mentioned film forming method so that the infrared-transmitting films 11 can be respectively formed on both surfaces of the substrate 1. Further, using a known substrate holding and rotating mechanism, the infrared-transmitting film 11 can be formed on all surfaces, including side surfaces, of the substrate 1.

As described above, according to this embodiment, the infrared-transmitting film 11 comprises the buffer layer 5 formed on the surface of the substrate 1 as an infrared optical substrate and having a Vickers hardness greater than that of the substrate 1 and the environmental resistance improving layer 7 provided in contact with the buffer layer 5 and having a Vickers hardness greater than that of the buffer layer 5.

Therefore, the infrared-transmitting film 11 is excellent in mechanical strength and environmental resistance compared to a conventional one.

EXAMPLES

Hereinbelow, this invention will be described in further detail with reference to Examples.

The infrared-transmitting film 11 shown in FIG. 2 was formed on the substrate 1 and the mechanical strength, the transmittance, and the environmental resistance were compared to those obtained in the case where the buffer layer 5 was not formed.
<Preparation of Samples>

Example 1

$BaF_2$ with a thickness of 2 mm was used as a substrate 1. Before forming a buffer layer 5, both surfaces of $BaF_2$ were flattened by polishing. A PZT material powder was used as a material of the buffer layer 5. By applying mechanical stress, the PZT material powder was pulverized to PZT fine particles with an average particle size of 0.1 to 1.0 μm. The PZT buffer layer 5 with a thickness of 0.3 μm and an average particle size of 0.1 μm or less was formed by the aerosol deposition method in which a reflective surface and the $BaF_2$ substrate were disposed in an evacuated film forming chamber and the PZT fine particles were aerosolized and brought into collision with the reflective surface and then were sprayed and adhere to the $BaF_2$ substrate surface set to a normal temperature in an evacuated state (1 kPa or less). On a surface of the PZT buffer layer 5 thus formed, $Y_2O_3$ fine particles of 0.1 μm to 1 μm prepared by applying the same treatment as that for the PZT material powder were sprayed using the aerosol deposition method, thereby forming a $Y_2O_3$ environmental resistance improving layer 7 with a thickness of 2 to 3 μm and an average particle size of 100 nm or less. In this manner, on the surface of the $BaF_2$ substrate 1, the PZT buffer layer 5 and the $Y_2O_3$ environmental resistance improving layer 7 were formed, thereby forming an infrared-transmitting film 11 with the structure shown in FIG. 2. With respect to the thicknesses of the buffer layer 5 and the environmental resistance improving layer 7 in Example 1, the main object is to obtain sufficient hardness as the infrared-transmitting film 11 and thus these thicknesses were not based on an optical design, but were set to the minimum values so as not to reduce the infrared transmittance as much as possible. In Example 1, the relationship of the Vickers hardnesses of the respective materials was as follows.

$BaF_2$ substrate (about 90 kgf/mm$^2$)<PZT (about 400 kgf/mm$^2$)<$Y_2O_3$ (about 800 kgf/mm$^2$)

For the relationship of the Vickers hardnesses of the respective materials, see also the following documents (this shall also apply to the following Example 2 and Comparative Example).

J. Iwasawa, R. Nishimizu, M. Tokita, M. Kiyohara and K. Uematsu, J. Ceram. Soc. Japan, Vol. 114 [3] (2006) pp272-276

H. Eilers, J. Eur. Ceram. Soc., Vol. 27, Issue 16, (2007), pp4711-4717

J. Akedo and M. Lebedev, Jpn. J. Appl. Phys., Vol. 41 (2002) pp6980-6984

J. Li, S. Wang, K. Wakabayashi, M. Esashi and R. Watanabe, J. Am. Ceram. Soc., Vol. 83, Issue 4, (2000), pp955-957

O. Guillon, F. Thiebaud, D. Perreux, C. Courtois, P. Champagne, A. Leriche, J. Crampon, J. Eur. Ceram. Soc., Vol. 25, Issue 12, (2005), pp2421-2424

Example 2

An infrared-transmitting film 11 was formed by the same method as in Example 1 except that a PLZT material powder was used as a material of a buffer layer 5. in Example 2, the relationship of the Vickers hardnesses of the respective materials was as follows.

$BaF_2$ substrate (about 90 kgf/mm$^2$)<PLZT (about 400 kgf/mm$^2$)<$Y_2O_3$ (about 800 kgf/mm$^2$)

Comparative Example 1

Figure 3:
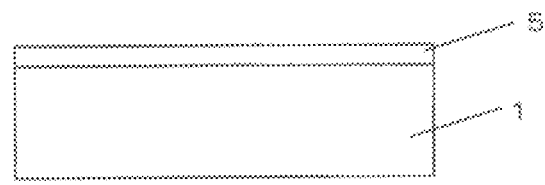
FIG. 3 is a structural diagram of Comparative Example 1.

Only a $Y_2O_3$ film as an environmental resistance improving layer 7 was formed on a $BaF_2$ substrate 1 by the aerosol deposition method without forming a buffer layer 5, thereby forming an infrared-transmitting film 11 with a structure shown in FIG. 3. The same method as in Example 1 was used as the film forming method. In Comparative Example 1, the relationship of the Vickers hardnesses of the respective materials was as follows.

$BaF_2$ substrate (about 90 kgf/mm$^2$)<<$Y_2O_3$ (about 800 kgf/mm$^2$)
<Scratch Test>

Figure 4:
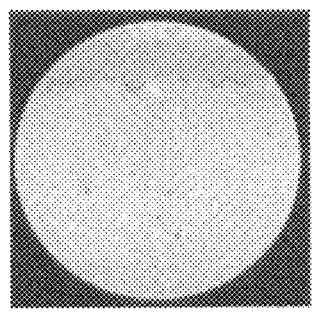
FIG. 4 is a diagram imitating a photograph of a surface of an infrared-transmitting film of Example 1 after a scratch test.
Figure 5:
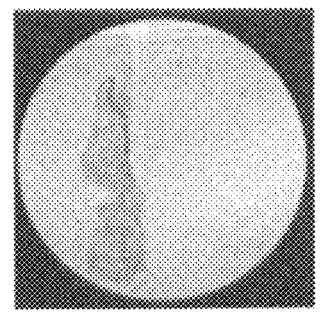
FIG. 5 is a diagram imitating a photograph of a surface of an infrared-transmitting film of Example 2 after a scratch test.
Figure 6:
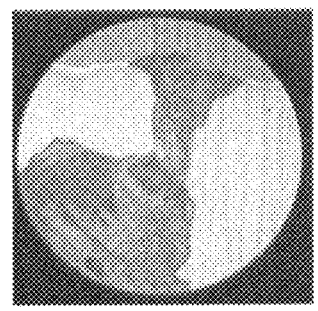
FIG. 6 is a diagram imitating a photograph of a surface of an infrared-transmitting film of Comparative Example 1 after a scratch test.

In order to evaluate the mechanical strength of the infrared-transmitting films 11, a scratch test using a ballpoint pen was carried out for the $Y_2O_3$ layers shown in Example 1, Example 2, and Comparative Example 1. The results of the scratch test are shown in FIGS. 4 to 6.

On the infrared-transmitting film 11 of Example 1 (FIG. 4), while an impression by the ballpoint pen was observed, the occurrence of a crack or the like was not observed.

Therefore, it was seen that excellent mechanical strength was obtained. On the infrared-transmitting film 11 of Example 2 (FIG. 5), while small damage was observed along an impression by the ballpoint pen, the spread of the damage was not observed. Therefore, the mechanical strength was obtained. On the other hand, on the infrared-transmitting film of Comparative Example 1 (FIG. 6), damage spread so that an impression by the ballpoint pen could not be seen, resulting in cracks. From these results, in the Examples of this invention where the buffer layer 5 was provided, the mechanical strength was improved compared to the conventional example where the buffer layer 5 was not provided.

In the case where there is a big difference of five times or more between the Vickers hardness of the substrate 1 and that of the material used as the environmental resistance improving layer 7, even if the environmental resistance improving layer 7 can be formed on the substrate 1, non-matching due to the hardness tends to occur between the substrate 1 and the environmental resistance improving layer 7 and therefore the strain tends to be stored in the environmental resistance improving layer 7, resulting in a state where peeling is likely to occur. On the other hand, in Examples 1 and 2, it was confirmed that the adhesion between the substrate 1 and the infrared-transmitting film 11 was improved to enhance the mechanical strength by providing the buffer layer having the hardness between that of the substrate 1 and that of the environmental resistance improving layer 7 so as to relax the mechanical strength non-matching between the substrate 1 and the environmental resistance improving layer 7.

<Infrared Transmittance Measurement Test>

Figure 7:
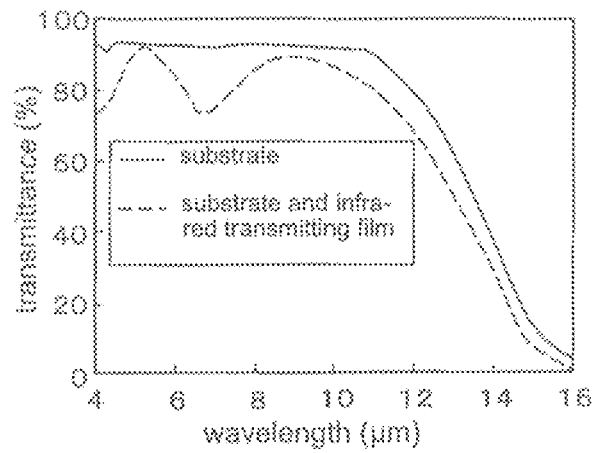
FIG. 7 is a diagram showing the wavelength dependence of the transmittance of Example 1 and the transmittance of a substrate 1 alone.

FIG. 7 shows a comparison between the infrared transmittance of the BaF$_2$ substrate alone and that of the BaF$_2$ substrate formed with the infrared-transmitting film 11 (Example 1). The BaF$_2$ substrate showed a transmittance of 90% or more until 10 μm was exceeded and, even at 14 μm, a transmittance of about 40% was obtained. In the substrate 1 of Example 1, while the transmittance was slightly reduced, a transmittance of about 85% was obtained at 10 μm and a transmittance of about 30% was obtained at 14 μm. It can be understood that, in Example 1, while the transmittance was slightly reduced because of not particularly based on an optical design and thus not optimizing the thickness of the infrared-transmitting film 11 or the like, the reduction was suppressed to about 5 to 10% compared to the case where the infrared-transmitting film 11 was not provided. Although not shown in the figure, similar results were obtained with respect to Example 2 and Comparative Example 1.

<Heat Cycle Test>

Figure 8:
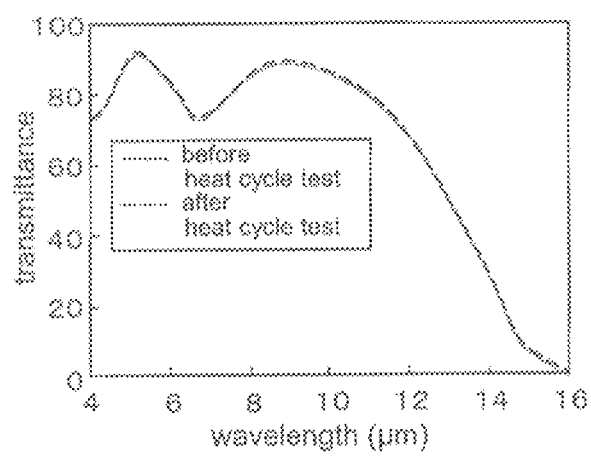
FIG. 8 is a diagram showing the wavelength dependence of the transmittance of Example 1 before and after a heat cycle test.

In order to evaluate the heat cycle resistance as one index of the environmental resistance, a heat cycle test was carried out for the sample of Example 1. In the heat cycle test, a process, in which the temperature change rate was set to 1° C./min, the minimum temperature to −20° C., and the maximum temperature to 100° C. and the holding time at the minimum temperature and at the maximum temperature was set to 20 minutes, was given as one cycle and 100 cycles were carried out in an actual measurement. FIG. 8 shows transmittances before and after the heat cycle test. As shown in FIG. 8, almost no change in transmittance was observed before and after the heat cycle test and thus degradation of the infrared-transmitting film 11 hardly occurred. That is, the infrared-transmitting film 11 with the structure shown in Example 1 sufficiently ensured the heat cycle resistance and thus had durability for use even in an environment where temperature changes were large.

The same heat cycle test was carried out also for Example 2 and Comparative Example 1. As a result, while the same results as in Example 1 were obtained in Example 2, cracks occurred over the entire surface of the infrared-transmitting film in Comparative Example 1.

The above-mentioned test results are summarized in Table 1. It was seen that sufficient environmental resistance was obtained in each of the infrared-transmitting films 11 of this invention shown in Examples 1 and 2 in which the buffer layer 5 was provided, compared to Comparative Example 1 in which the buffer layer 5 was not provided.

TABLE 1

|  | Example 1 | Example 2 | Comparative Example 1 |
| --- | --- | --- | --- |
| Environmental Resistance Improving Layer | Y$_2$O$_3$ | Y$_2$O$_3$ | Y$_2$O$_3$ |
| Buffer Layer | PZT | PLZT | none |
| Scratch Test | no occurrence of crack | damage occurred but not resulting in a crack | large cracks spread in a chain reaction |
| Mechanical Strength | improved compared to BaF$_2$ substrate | improved compared to BaF$_2$ substrate | Y$_2$O$_3$ film peeled |
| Optical Property | to a degree that optical property was reduced by 5 to 10% | to a degree that optical property was reduced by 5 to 10% | to a degree that optical property was reduced by 5 to 10% |
| External Appearance after Heat Cycle Test | no change | no change | cracks and peeling occurred |

INDUSTRIAL APPLICABILITY

While the structures and manufacturing methods of the infrared-transmitting films of this invention have been described, the structures and configurations shown in this invention are only by way of example for demonstrating its effect and are not limited to the above-mentioned embodiment and Examples.

The infrared-transmitting film of this invention is capable of giving high environmental resistance at a low cost to a low-priced infrared optical component typified by BaF$_2$. The infrared optical component obtained in this invention is applicable to many infrared devices typified by an infrared camera.

This application claims the benefit of priority from Japanese Patent Application No. 2011-115322, filed on May 24, 2011, the disclosure of which is incorporated herein in its entirety by reference.

DESCRIPTION OF SYMBOLS 1 substrate 5 buffer layer 7 environmental resistance improving layer 11 infrared-transmitting film 13 optical system 15 case 100 optical component 200 infrared device

The invention claimed is:

1. An infrared-transmitting device comprising:
an infrared optical substrate,
an infrared-transmitting film formed on the substrate,
wherein the infrared-transmitting film comprises a buffer layer provided on the substrate and an environmental resistance improving layer provided on the buffer layer,
wherein the buffer layer comprises a laminate of brittle material particles to improve on mechanical strength between the substrate and the environmental resistance improving layer, and
wherein the environmental resistance improving layer comprises a laminate of brittle material particles, and
an anchor layer formed at the interface between the buffer layer and the environmental resistance improving layer, and having a thickness of 0.05 µm to 0.5 µm,
wherein a Vickers hardness of each of the substrate, a buffer layer formed on a surface of the substrate and having a Vickers hardness greater than that of the substrate, an environmental resistance improving layer provided in contact with the buffer layer and having a Vickers hardness greater than that of the buffer layer,
wherein the buffer layer has the Vickers hardness more than four times as large as that of the substrate, and
wherein the environmental resistance improving layer has the Vickers hardness which is laid in a range of 100 kgf/mm$^2$ to 1000 kgf/mm$^2$.

2. The infrared-transmitting device according to claim 1, wherein a material forming the substrate comprises a metal halide.

3. The infrared-transmitting device according to claim 2, wherein the material forming the substrate comprises barium fluoride (BaF$_2$).

4. The infrared-transmitting device according to claim 1, wherein a material forming the buffer layer is an infrared optical material containing lead.

5. The infrared-transmitting device according to claim 4, wherein the material forming the buffer layer contains at least one kind from lead titanate (PT), lead zirconate (PZ), lead zirconate titanate (PZT), and lanthanum-doped lead zirconate titanate (PLZT).

6. The infrared-transmitting device according to claim 1, wherein the environmental resistance improving layer comprises a polycrystalline film of a metal oxide.

7. The infrared-transmitting device according to claim 6, wherein the metal oxide is yttrium oxide (Y$_2$O$_3$).

8. The infrared-transmitting device according to claim 1, wherein the buffer layer has a thickness of 0.1 µm to 5 µm and the environmental resistance improving layer has a thickness of 0.1 µm to 10 µm.

9. The infrared-transmitting device according to claim 1, wherein materials forming the buffer layer and the environmental resistance improving layer are each a polycrystalline material with an average crystal grain size of 0.1 µm or less.

10. An infrared-transmitting device manufacturing method forming the infrared-transmitting device according to claim 1 by an aerosol deposition method.

11. An infrared optical component comprising the infrared-transmitting device according to claim 1.

12. An infrared device comprising the infrared optical component according to claim 11.

13. The infrared-transmitting device according to claim 1, wherein the brittle material particles have an average grain size of 0.1 µm or less.

* * * * *